United States Patent [19]
Rosenmayer et al.

[11] Patent Number: 5,675,686
[45] Date of Patent: Oct. 7, 1997

[54] BUFFER MATERIAL FOR OPTICAL SIGNAL TRANSMISSION MEDIA

[75] Inventors: Charles T. Rosenmayer, Eau Claire, Wis.; James Eachus, Manor, Tex.; Anand Laxminarayan, Bear; William E. Delaney, Hockessin, both of Del.; Dick Holcomb, Austin, Tex.

[73] Assignee: W. L. Gore & Associates, Inc., Newark, Del.

[21] Appl. No.: 498,491

[22] Filed: Jul. 5, 1995

[51] Int. Cl.⁶ .................................................. G02B 6/44
[52] U.S. Cl. ..................... 385/114; 385/128; 385/141
[58] Field of Search ..................... 385/100–114, 123, 385/126, 127, 128, 141, 144, 145

[56] References Cited

U.S. PATENT DOCUMENTS

| | | | |
|---|---|---|---|
| 4,710,353 | 12/1987 | Tanaka et al. | 385/126 X |
| 4,770,489 | 9/1988 | Saito et al. | 385/113 |
| 4,810,836 | 3/1989 | Shinoda et al. | 174/139 |
| 4,812,014 | 3/1989 | Sawano et al. | 385/105 X |
| 5,002,359 | 3/1991 | Sayegh | 385/107 |
| 5,062,685 | 11/1991 | Cain et al. | 385/114 |
| 5,189,721 | 2/1993 | Sayegh et al. | 385/114 |
| 5,210,377 | 5/1993 | Kennedy et al. | 174/107 |
| 5,253,318 | 10/1993 | Sayegh et al. | 385/114 |
| 5,293,442 | 3/1994 | Sayegh | 385/102 |
| 5,333,229 | 7/1994 | Sayegh | 385/102 |
| 5,485,541 | 1/1996 | Bigley, Jr. et al. | 385/141 |

FOREIGN PATENT DOCUMENTS

| | | |
|---|---|---|
| 0 422 764 | 4/1991 | European Pat. Off. . |
| 53-123152 | 10/1978 | Japan . |
| 55-04224 | 3/1988 | Japan . |

*Primary Examiner*—John D. Lee
*Attorney, Agent, or Firm*—Victor M. Genco, Jr.

[57] ABSTRACT

An improved optical signal transmission media comprises at least one light-transmitting fiber core defined by a cladded optical fiber, and a buffering surrounding the light transmitting fiber core. The buffering is defined by a closed-cell porous polymer material.

2 Claims, 3 Drawing Sheets

BUFFER MATERIAL FOR OPTICAL SIGNAL TRANSMISSION MEDIA

FIELD OF THE INVENTION

This invention generally relates to a mechanical buffer material for a signal transmission media. More particularly, the present invention relates to an improved buffer material for optical signal transmission media.

BACKGROUND OF THE INVENTION

Optical fiber systems are revolutionizing such industries as the telecommunication and computer industries. These optical fiber systems are more economical and more robust than alternatives which have been used in the past, such as copper wire, radio relay, or satellite configurations. For example, regeneration of signals transmitted on copper cables is necessitated at intervals of distance measured in terms of a few miles, whereas with optical fibers, fewer regenerations over longer distances are needed. Also, contemporary commercial optical fiber systems have been designed to operate at 10 billion bits per second, and higher speeds have been demonstrated.

An optical fiber may be described as a very thin thread or strand of a light-transmitting medium. Predominantly, the optical medium used is very pure silica ($SiO_2$) glass, sometimes with minute quantities of dopants such as germania ($GeO_2$) added to the glass to produce small changes of its refractive index. When used as the connecting link between (1) a light source and (2) a light receiver (photoreceptor), the fiber-optic system substitutes photons for electrons, which characterize the traditional metal-conductor communication link. In order for a fiber optic system to perform as designed, the optical fibers must be reliable and protected from environmental conditions.

Glass is an extremely brittle material, and accordingly, even strong optical fibers may break at as little as 1% elongation. The fragility and relatively small elongation capability of glass fibers (as compared to copper which may elongate up to 20% without breaking) influence the design of optical systems. Unlike a conventional electrical cable, where the copper wires themselves are the principal load-bearing members, it is desirable to avoid significant tensile loading of glass fibers. Also, because fibers do not deform plastically, they have little capacity to absorb energy. Hence, the optical cable design must isolate the fibers from impact loads to prevent the optical fibers from fracturing. Additionally, the small elongation capability of optical fibers makes it desirable to keep the optical fibers close to a neutral axis of the fiber optic cable, or to provide space for the fibers to move to positions of reduced stress when the cable is bent. In summary, an ideal buffering system for a fiber optic bundle will isolate the fibers from impact loads, limit the bending radii of the fiber optic bundle, and protect the optical fibers from external environmental conditions.

An optical fiber may be protected from environmental conditions by a plurality of cladding and buffer materials. More particularly, an optical fiber is typically coated with a cladding, such as a thick layer of a rapidly curing polymer material. The cladding protects the bare fiber from the slight stresses incurred during shipping and processing. Also, the cladded optical fiber may be surrounded with a buffer material which further protects the optical fiber from more severe stresses. Such severe stresses may include radial crushing, bending, or point loading. Additionally, the buffered optical fiber may be combined with a strength member which provides load sharing in the axial direction. Finally, a jacket may be provided to contain the cladded optical fiber, the buffer material and the strength member.

Generally, there are three techniques for providing a buffer for an optical fiber system, namely a "tight tube" type buffer, a "loose tube" type buffer, and a "firm tube" type buffer.

The "tight tube" buffer typically comprises an essentially full density thermoplastic polymer extruded directly onto the cladding of the optical fiber. This type buffer is relatively inexpensive and small in size. However, the "tight tube" buffer induces thermal stresses in the optical fiber because it is applied to the optical fiber at high temperatures. Additionally, it is known that the "tight tube" type buffer provides extremely poor protection to the optical fiber from external stresses.

The "loose tube" type buffer comprises a hollow tube (typically plastic) with an inner diameter substantially larger than the outer diameter of the cladded optical fibers. The space between the inner diameter of the tube and the outer diameter of the coated fiber may be filled with a soft jelly-like material. The "loose tube" buffer has the advantage of providing good isolation of the fiber from external stresses. However, this type of buffer is larger in size than the "tight tube" type buffer. Also, optical fiber systems incorporating such "loose tube" type buffering are relatively expensive to manufacture and to terminate.

The "firm tube" type buffer comprises a layer of expanded polytetrafluoroethylene (ePTFE) which may be bonded to a cladded optical fiber. The structure of the ePTFE is best described as an open cell fibril and node structure. The layer of ePTFE provides about the same mechanical protection as the "loose tube" type buffer, while providing the small size and ease of termination of the tight tube buffer. However, the "firm tube" type buffer is more expensive than the "tight tube" type buffer.

The computer/telecommunications industry is migrating towards the use of multimode (as opposed to single-mode) optical fibers for short length (<1 km) applications because of the lower termination costs of multimode technology. However, multimode fibers are much more susceptible to signal degradation from mechanical stress than are single-mode fibers. An improved buffer material is needed that will reduce this susceptibility to signal degradation by absorbing stresses and minimizing stress gradients at the core/cladding interface.

The foregoing illustrates limitations known to exist in present optical fiber systems. Thus, it is apparent that it would be advantageous to provide an improved optical fiber system directed to overcoming one or more of the limitations set forth above. Accordingly, a suitable alternative is provided including features more fully disclosed hereinafter.

SUMMARY OF THE INVENTION

The present invention advances the art of mechanical buffering of optical fibers, and the techniques for creating such buffers, beyond which is known to date. In one embodiment of the present invention, an improved optical signal transmission media is provided which comprises at least one light-transmitting fiber core defined by a coated and cladded optical fiber, and a buffering surrounding the light transmitting fiber core. The buffering is defined by a closed-cell porous polymer material having a minimum porosity per unit volume of material of about 10%. In another embodiment of the present invention, an optical fiber ribbon cable is provided which comprises a plurality of polymer coated optical fibers disposed in parallel arrangement, one to each other, and a buffering surrounding the plurality of optical fibers. The buffering is defined by a closed-cell porous polymer material.

The buffering may be comprised at least in part of the following materials: foamed polyethylene; expanded foamed polyethylene; porous polypropylene; foamed polyurethane; foamed polytetrafluoroethylene; foamed fluorinated ethylenepropylene (FEP); foamed polyvinyl chloride (PVC); foamed rubber; a closed cell, porous film; a biaxially oriented, closed cell, 50% porous co-extruded polypropylene film; blends of the above; or any other suitable closed cell, porous material.

The improved optical signal transmission media and/or the optical fiber ribbon cable may include a strength member, such as but not limited to fibers consisting of aramid polyester, polytetrafluoroethylene, polysulfone, or polyamide fibers. Additionally, the improved optical signal transmission media and/or the optical fiber ribbon cable may include a protective polymer jacket. The protective polymer jacket may comprise, but is not limited to polyester terephthalate polyimide, polyether ether ketone, organopolysiloxane-imide, polyester, full density polytetrafluoroethylene (PTFE) tape, tetrafluoroethylene-hexafluoropropylene copolymer, perfluoroalkoxy tetrafluoroethylene, ethylene-tetrafluoroethylene copolymer, copolymer of ethylene and PTFE, polyvinyl chloride, polyvinyldene fluoride, rubber, silicone, or urethane.

It is, therefore, a purpose of the present invention to provide an improved buffer for an optical fiber system.

It is another purpose of the present invention to provide an inexpensive optical fiber buffer.

It is another purpose of the present invention to provide an improved optical fiber buffer which does not complicate the termination process of an optical fiber system.

It is yet another purpose of the present invention to provide an improved optical fiber buffer which is small and lightweight.

It is yet another purpose of the present invention to provide an improved optical fiber buffer which provides excellent protection to an optical fiber system from external stresses.

It is still another purpose of the present invention to provide an improved optical fiber buffer which does not induce stresses on an optical fiber system during the application of the buffer to the optical fiber system.

The foregoing and other aspects will become apparent from the following detailed description of the invention when considered in conjunction with the accompanying drawing figures.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

The present invention provides an improved buffer for an optical fiber system. The improved buffer comprises a closed-cell porous polymeric material, having a minimum porosity per unit volume of material of about 10%, such as a foamed polymeric material, for example. Suitable porous polymeric materials include, but are not limited to, foamed polyethylene, porous polypropylene, foamed polyurethane, foamed polytetrafluoroethylene (PTFE), foamed fluorinated ethylenepropylene (FEP), foamed polyvinyl chloride (PVC), foamed rubber, or blends of the above, for example.

These porous polymers have more mechanical compliance compared to full density polymers because they contain a significant amount of void space. More particularly, the essential purpose of a buffer material is to widely distribute mechanical loads in both a temporal and spacial sense. This is because glass fibers are susceptible to fracture when subjected to closely distributed temporal loads, i.e. impact loads. A more common term for this is "strain rate sensitivity." Spacial distribution of loads is necessary to both 1) reduce microbending losses caused by point loads; and 2) reduce the susceptibility to fiber fracture by concentrated loads. Porous polymers offer improved temporal load distribution by having a lower amount of material in the loaded area. Since there is less material available to absorb the load, the effective unit loading is higher. This higher loading means that the material undergoes more plastic (versus elastic) deformation. The plastic deformation prevents loads from being rapidly transferred to the fiber. The spacial load distribution is accomplished in a similar manner. Because there is less material in the area of the load, the load must be distributed over a wider area.

Accordingly, as explained in further detail hereinafter, when subjected to non-uniform loads such as microbending tests, the buffering material of the present invention provides more effective protection to an optical fiber system than buffering materials which have been employed heretofore.

Figure 1:
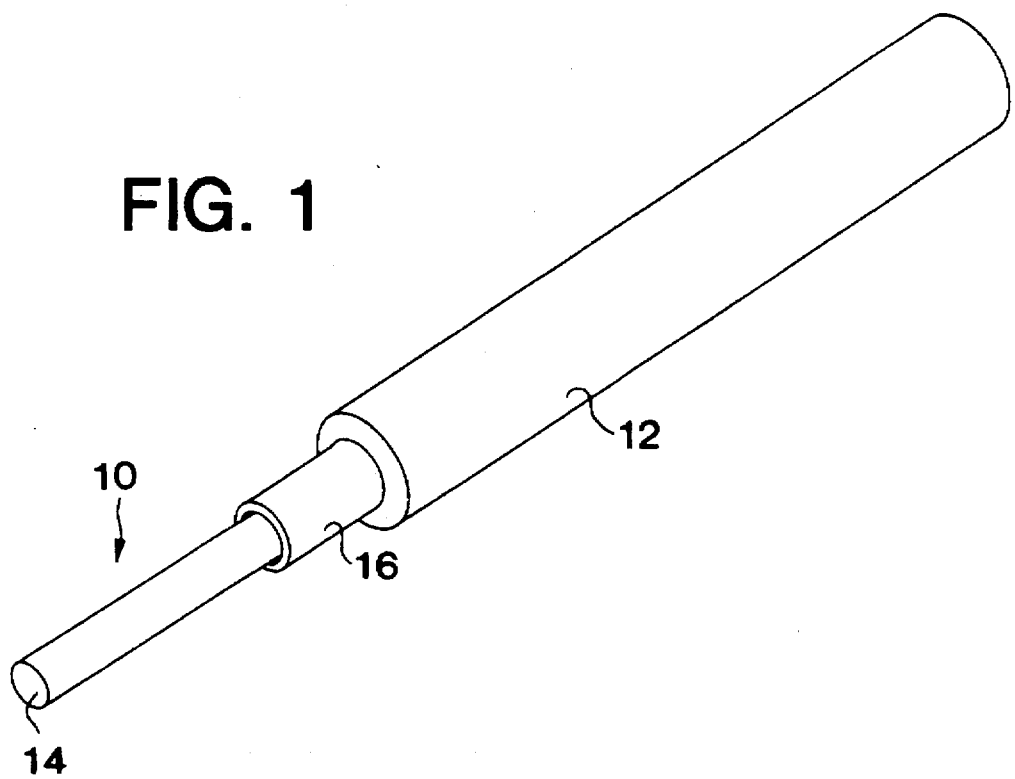
FIG. 1 is a layered, perspective view of an individual optical fiber having the buffer material of the present invention.

Referring now to the drawings, wherein similar reference characters designate corresponding parts throughout the several views, FIG. 1 generally illustrates at 10 a buffered optical fiber in accordance with the teachings of the present invention. The buffered optical fiber 10 includes a porous buffering 12 of the present invention, which is described in detail hereinafter. The optical fiber cable also is defined by a conventional a core 14 and a cladding 16. The core 14 may comprise any suitable light transmitting material, such as but not limited to, pure silica ($SiO_2$) glass, silica ($SiO_2$) glass doped with a suitable material such as germania ($GeO_2$), heavy metal fluoride-based glass, chalcogenide glass, fluoride-based glass, borosilicate-based glass, or plastic, for example. Surrounding the core 14 is a cladding 16 comprised of, for example, a pure silica, or an amorphous fluoropolymer. The cladded core may additionally be coated with a polyimide, acrylic, polyether ether keytone, polyurethane or other suitable polymer coatings. The amorphous fluoropolymer may be a homopolymer of bis (trifluoromethyl)difluorodioxole or a copolymer with tetrafluoroethylene or other fluorinated ethylenes. The core 14, cladding 16 and the coating materials are generally known in the art and may be obtained as an integral optical fiber from such suppliers as Corning Incorporated, for example.

Figure 2:
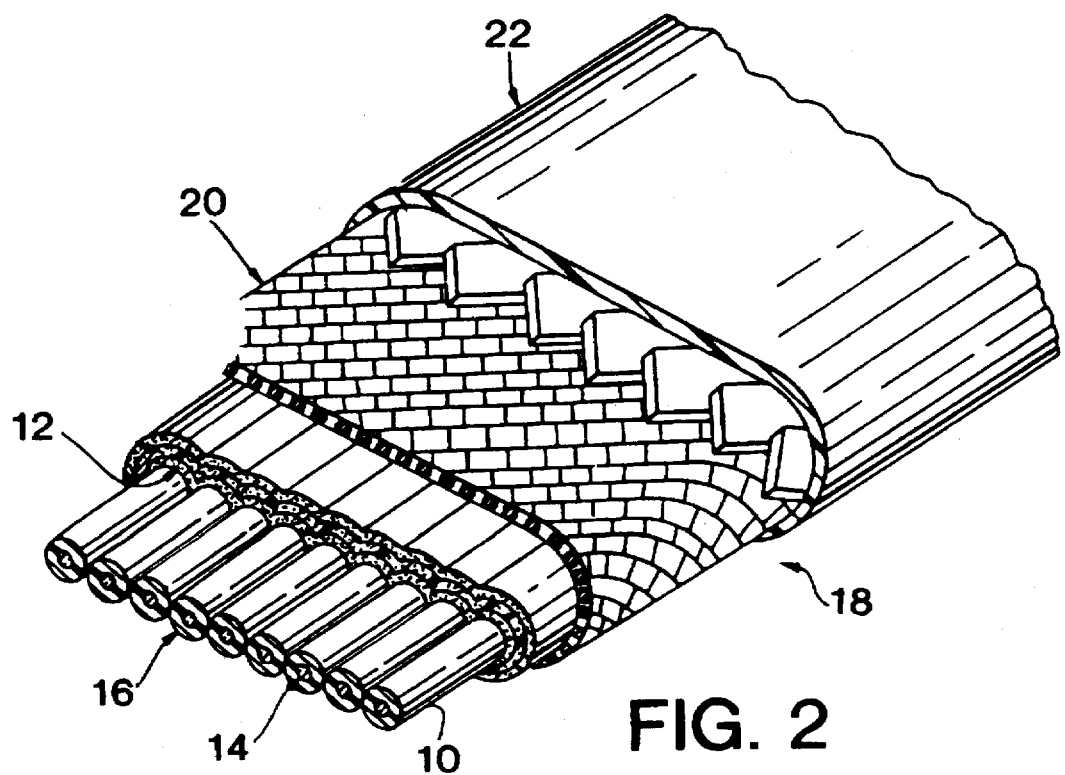
FIG. 2 is a layered, perspective view of a multi-fiber optical ribbon having the buffer material of the present invention.
Figure 3:
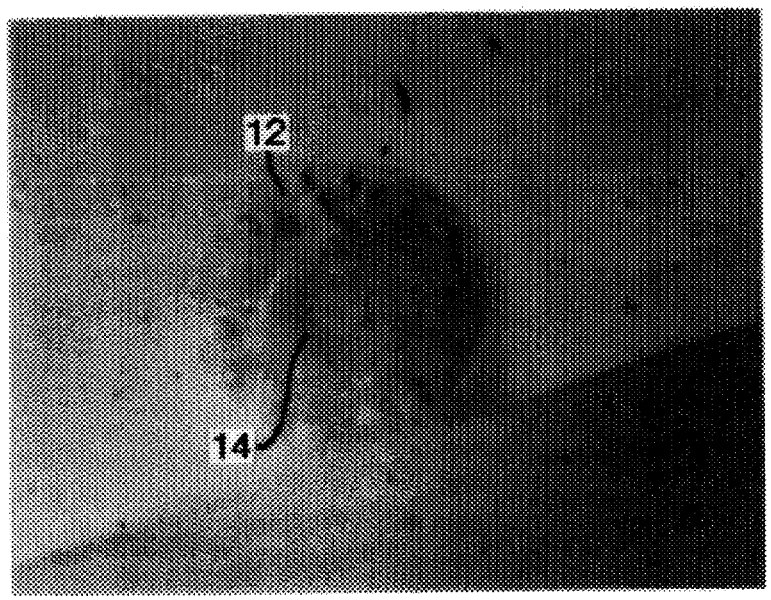
FIG. 3 is a photomicrograph, at a magnification of ~100X, of an individual optical fiber having the buffer material of the present invention.

FIG. 2 illustrates generally at 18 a multi-fiber optical ribbon cable comprised of a plurality of the individual optical fibers described above. The multi-fiber optical ribbon cable of FIG. 2 includes a foamed buffering 12 in accordance with the teachings of the present invention.

The optical fiber cables of FIGS. 1 and 2 can be protected further by one or more strength members 20, and/or one or more jacket layers 22. Such one or more jacket layers 22 may comprise a protective polymer material, which may include but not limited to, polyimide tape, polyether ether ketone, organopolysiloxane-imide, polyester, full density polytetrafluoroethylene (PTFE) tape, tetrafluoroethylene-hexafluoropropylene copolymer, perfluoroalkoxy tetrafluoroethylene, ethylene-tetrafluoroethylene copolymer, copolymer of ethylene and PTFE, polyvinyl chloride, rubber, silicone, urethane, or other suitable thermoplastic or non-thermoplastic materials, for example. The strength member may be comprised of braided fibers selected from a group consisting of, but not limited to, polyester, polytetrafluoroethylene, polysulfone, and polyamide fibers.

The buffering 12 may comprise any suitable closed-cell porous polymer. In one embodiment of the present invention, a foam polyethylene is provided as the buffering material 12. The foamed polyethylene permits an inherent inclusion of chemical blowing agents within the material which enhances even dispersion of gas throughout the buffering thickness. The foamed polyethylene possesses excellent process parameters, which are outlined in Table 2 below. (The parameters of Table 2 relate to a process which employs a ½" conventional crosshead extruder with a 24:1 L/D and a standard metering screw, at a line speed of 150 feet per minute, and a buffer thickness of 8 mils.) Also, the foamed polyethylene is lightweight, and may be provided with antioxidants and metal deactivators to prevent degradation. Finally, the foamed polyethylene comprises a good balance of physical properties, as evidenced by the values of Table 1 below. A suitable type of foamed polyethylene for the buffer 12 may be purchased from Quantum Chemical Co., Cincinnati, Ohio under the tradename PETROTHENE LR-5860-00.

TABLE 1

| Physical Properties | Nom. Value | Units | ASTM Method |
| --- | --- | --- | --- |
| Density | .946 | g/cm³ | D1505 |
| Malt Index | .80 | g/10 min. | D1238 |
| Low Temperature Brittleness, f50 | <−76 | C. | D746 |
| Tensile Strength @ Break | 3625 | psi | D638 |
| Tensile Strength @ Yield | 2990 | psi | D638 |
| Elongation | 890 | % | D638 |
| Dielectric Constant | 2.33 | | D1531 |
| Dissipation Factor | .00027 | | D1531 |
| Volume Resistivity | 1 × 10d16 | ohm-cm | D991 |

TABLE 2

| Extruder Zone | Temperature Range (°F.) |
| --- | --- |
| Feed | 300–325 |
| Zone 2 | 350–400 |
| Zone 3 | 400–415 |
| Zone 4-x | 410–420 |
| Adapter | 410–420 |
| Die | 410–420 |
| Melt Temperature | 410–420 |

The aforedescribed polymers may be made porous, or may be foamed, by any suitable method. For example, the porosity may be created by a chemical foaming agent, whereby the porosity is achieved when the polymer is melted in the presence of the chemical foaming agent. The chemical foaming agent reacts to form a gaseous by-product, which becomes entrapped within the molten polymer, thereby creating porosity, generally of the closed cell type. Additionally, porosity may be created by the injection of a gas into the molten polymer. Porosity may also be achieved by sintering together loosely compacted particles. Also, porosity may be achieved in the polymer by mechanical expansion of the polymer under predetermined conditions. As should be understood, polymer chains generally separate during a mechanical expansion process which results in porosity, generally of the open cell type.

Application of the porous polymer to the individual or plurality of optical fibers may be accomplished by any suitable method. For example, a thermoplastic extrusion process may be employed, whereby the temperature in the extruder is sufficient to initiate the foaming reaction. Also, a dip coating process may be employed wherein the polymer and a foaming agent are applied to optical fiber(s) prior to foaming; a subsequent thermal or chemical treatment would be employed to cause the foaming reaction. Additionally, a porous polymer may be prepared in tape form prior to applying it to the waveguide. The tape may be applied to the waveguide by wrapping or by laminating. Low-temperature thermoplastic porous polymers may be bonded to the fibers without the use of a separate adhesive as in the prior art. However, an adhesive may be required to provide sufficient bonding of the tape to the waveguide. A porous polymer may also be prepared in a tubular or hollow form into which an optical fiber is inserted.

Without intending to limit the scope of the present invention, the apparatus and method of production of the present invention may be better understood by referring to the following examples:

EXAMPLE 1

A fiber optic ribbon cable was manufactured by simultaneously laminating TRESPAPHAN® film type OND 80 and MIL-ENE® C tape to a linear array of 10 multimode (62.5/125/250) optical fibers at 150° C. in a controlled displacement fixture without losing porosity. The fiber is available as a commodity from companies such as the Corning Corporation, AT&T, or Spectran, for example. The OND 80 film was sandwiched between the fibers and the MIL-ENE® C. TRESPAPHAN® OND 80 film is a biaxially oriented, closed-cell, 50% porous co-extruded polypropylene film manufactured by the Hoechst Chemical Corporation. MIL-ENE® C film is manufactured by W.L. Gore & Associates, Inc. The type OND 80 film exhibited the following properties:

| Characteristics | Type OND 80 | Unit | Test Method |
|---|---|---|---|
| Nominal thickness | 80 | μm | DIN 53 370 |
| Density | 0.55 | g/cm³ | DIN 53 479 |
| Weight per unit area | 44 | g/m² | DIN 53 352 |
| Yield | 22.7 | m²/kg | DIN 53 352 |
| Tensile strength | | | |
| machine | 60 | N/15 mm | DIN 53 455 |
| transverse | 160 | | ASTM D 882 |
| Elongation at break | | | DIN 53 455 |
| machine | 120 | % | |
| transverse | 30 | | |
| Low temperature resistance | <–60 | °C. | DIN 53 372 |
| Heat seal temperature | 120–140 | °C. | — |
| Heat seal strength | 1.8 | N/15 mm | OPMA T.C. 4.1. |
| Wettability | 36–39 | mN/m | DIN 53 364 ASTM D 2578 |
| Opacity | 90 | % | DIN 53 146 |
| Water vapor permeability | | | |
| 23° C./85% humidity | 0.7 | g/m2 · d | DIN 53 122 |
| 38° C./90% humidity | 3.3 | | ASTM E 96 |

EXAMPLE 2

TRESPAPHAN® type OND 80 film was tape wrapped onto a single multimode (62.5/125/250) optical fiber at an elongation of 3% and an angle of 25 degrees. The slit width was 0.090" and two wraps of the material were applied. The film was heat sealed to itself and to the fiber coating at 135° C. without losing porosity.

EXAMPLE 3

A conventional multimode (62.5/125/250) optical fiber was coated with a foamed polyethylene (fPE) buffer material having a wall thickness of about 200 microns. The fPE was grade PETROTHENE LR-5860-00 purchased from Quantum Chemical Co., Cincinnati, Ohio. The coating was done on a 1½" thermoplastic extruder utilizing the process parameters:
Line Speed: 150 (feet per minute FPM)
Thickness: 8 mils

| Extruder Zone | Temperature Range (°F.) |
|---|---|
| Feed | 300–325 |
| Zone 2 | 350–400 |
| Zone 3 | 400–415 |
| Zone 4-x | 410–420 |
| Adapter | 410–420 |
| Die | 410–420 |
| Melt Temperature | 410–420 |

Figure 4:
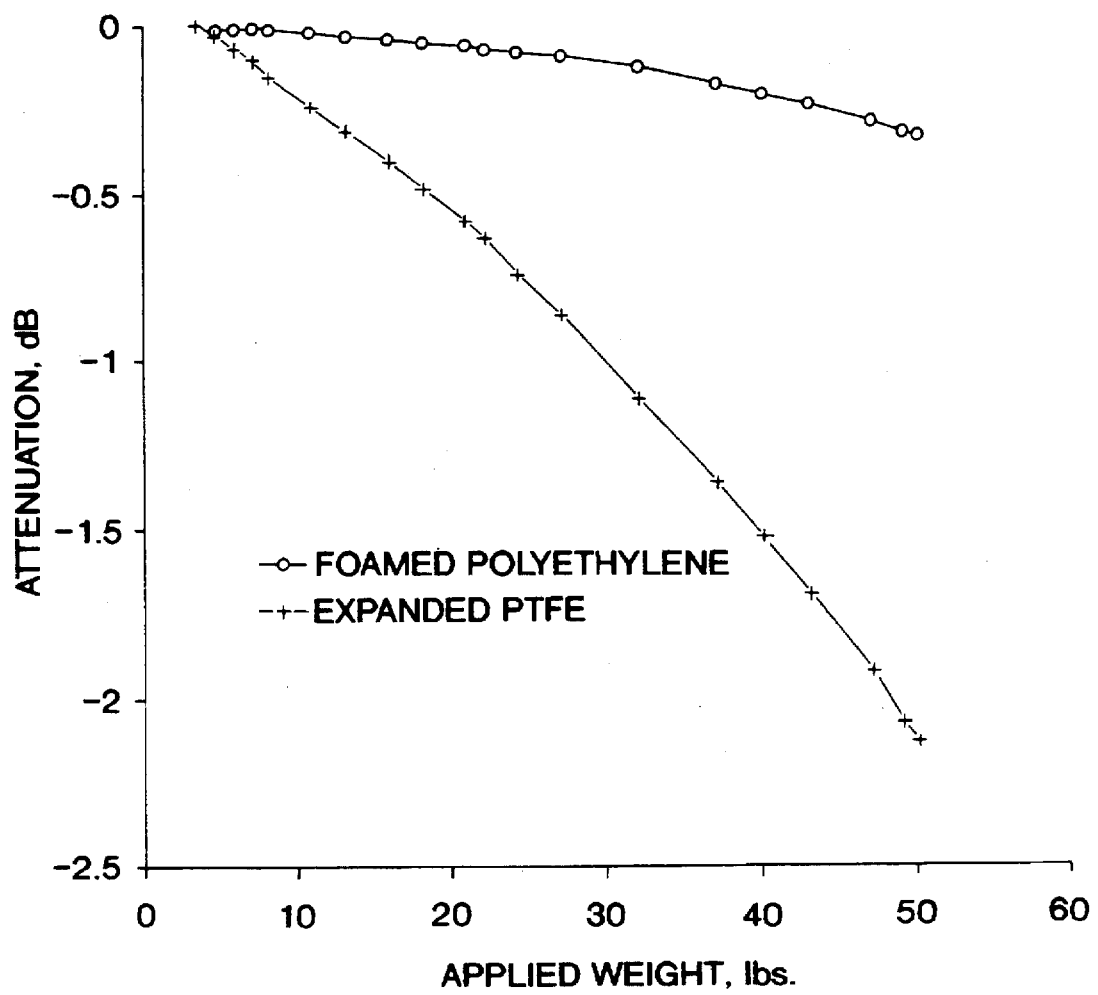
FIG. 4 is a graph summarizing optical fiber microbend test data, collected in accordance with EIA-455-68, comparing a single optical fiber buffered by an expanded polytetrafluoroethylene (ePTFE) tape, and the buffer material of the present invention.

An optical fiber cable, of the type described in Example 1, and an optical fiber wrapped with an expanded polytetrafluoroethylene tape were evaluated in accordance with optical fiber microbend test procedure EIA 455-68. The ePTFE film used was a 0.003" TEX-S type tape applied in three wraps. (TEX-S type expanded polytetrafluoroethylene tape was obtained from W.L. Gore and Associates, Inc.) Total overall buffer thickness was 0.008". The results of this testing are summarized in FIG. 4, wherein the results for an optical fiber wrapped in the expanded PTFE tape are compared with the results for an optical fiber buffered in accordance with Example 1.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. An improved optical signal transmission media comprising:

at least one light-transmitting fiber core including a cladded optical fiber;

a buffering surrounding the light transmitting fiber core, the buffering defined by a closed-cell porous polymer material; and wherein said buffering is comprised at least in part from a group consisting of foamed polyethylene, porous polypropylene, foamed polyurethane, foamed polytetrafluoroethylene, foamed flourinated ethylenepropylene (FEP), foamed rubber, and biaxially oriented, closed cell, 50% porous co-extruded polypropylene film.

2. An optical fiber ribbon cable comprising:

a plurality of polymer coated optical fibers disposed in parallel arrangement, one to each other;

a buffering at least partially surrounding said plurality of optical fibers, the buffering defined by a closed-cell porous polymer material; and wherein said buffering is comprised at least in part from a group consisting of foamed polyethylene, porous polypropylene, foamed polyurethane, foamed polytetrafluoroethylene, foamed fluorinated ethylenepropylene (FEP), foamed rubber, and biaxially oriented, closed cell, 50% porous co-extruded polypropylene film.

* * * * *